No. 831,372. PATENTED SEPT. 18, 1906.
F. NOTZ & J. McBRIAR.
MIXING MACHINE.
APPLICATION FILED APR. 13, 1906.

2 SHEETS—SHEET 1.

Witnesses:
Inventors

No. 831,372. PATENTED SEPT. 18, 1906.
F. NOTZ & J. McBRIAR.
MIXING MACHINE.
APPLICATION FILED APR. 13, 1906.

2 SHEETS—SHEET 2

Witnesses:
C. O. Shurvey
T. H. Alfreds

Inventors.
Felix Notz
& James McBriar
By Penn & Fisher
Attys.

UNITED STATES PATENT OFFICE.

FELIX NOTZ AND JAMES McBRIAR, OF CHICAGO, ILLINOIS; SAID McBRIAR ASSIGNOR TO SAID NOTZ.

MIXING-MACHINE.

No. 831,372.　　　　Specification of Letters Patent.　　　Patented Sept. 18, 1906.

Application filed April 13, 1906. Serial No. 311,433.

*To all whom it may concern:*

Be it known that we, FELIX NOTZ and JAMES McBRIAR, citizens of the United States, residing at Chicago, in the county of Cook and State of Illinois, have invented certain new and useful Improvements in Mixing-Machines, of which we do declare the following to be a full, clear, and exact description, reference being had to the accompanying drawings, forming part of this specification.

The present invention, while susceptible of other uses, is more particularly designed to provide an improved machine for the mixing of dough, from which bread or similar bakery products are to be made.

The object of the invention is to provide an improved machine that shall serve to thoroughly mix the ingredients of the batch of dough, that shall effectively open up and expose the gluten cells of the batch, and that shall impart to the dough a more desirable quality than it has been possible to obtain by any mixing-machines with which we are familiar.

To this end the invention consists in the features of novelty hereinafter described, illustrated in the accompanying drawings, and particularly pointed out in the claims at the end of this specification.

Figure 1:
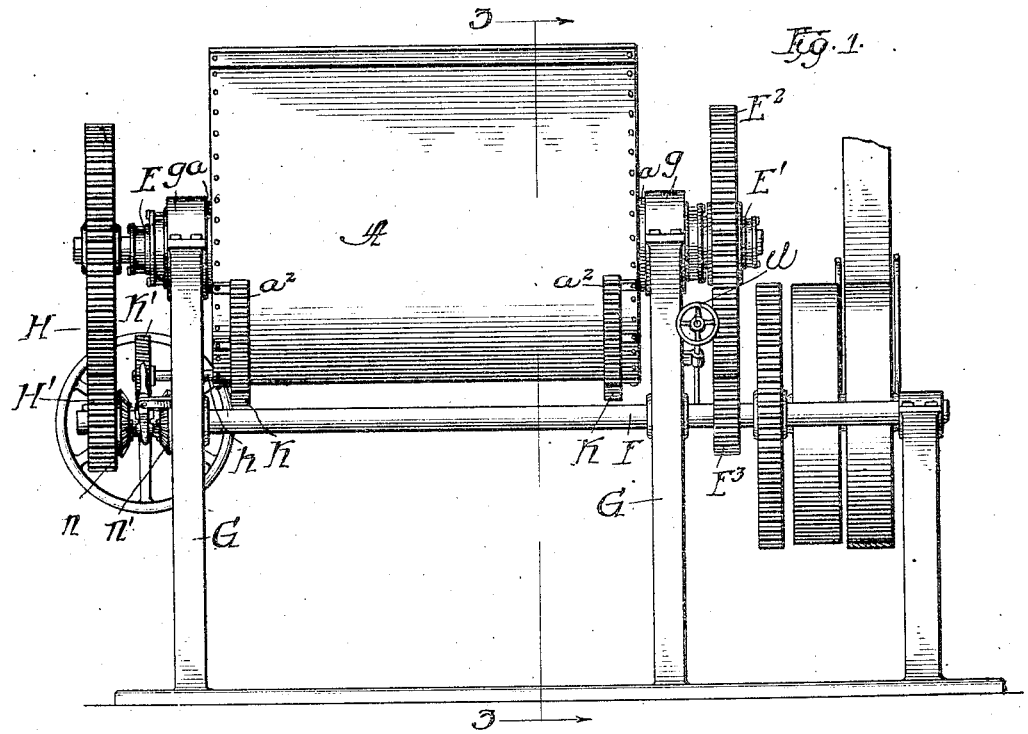
Figure 2:
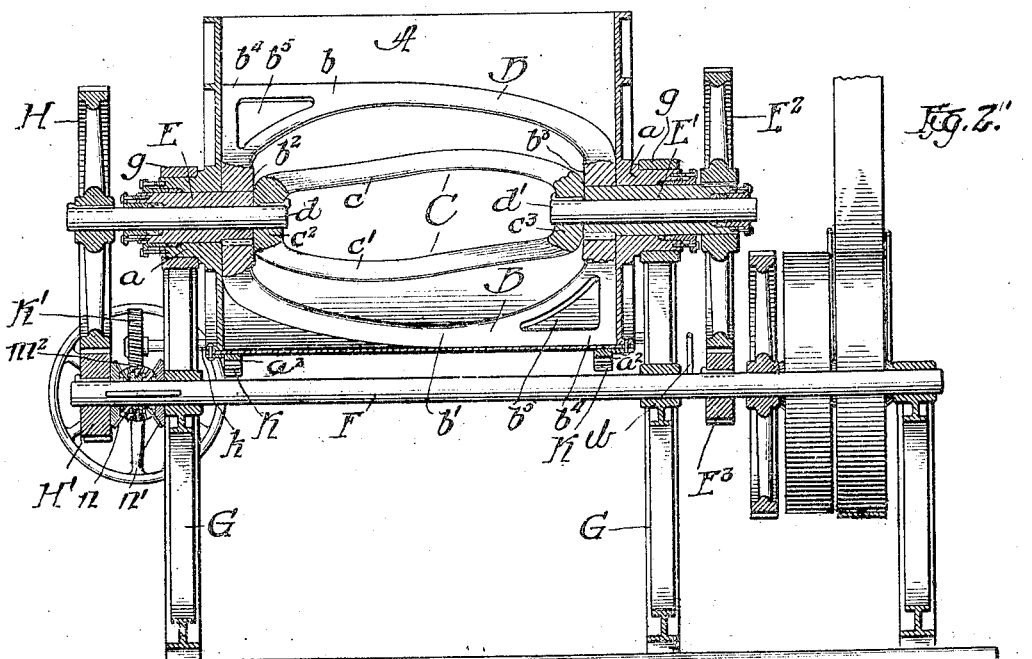
Figure 3:
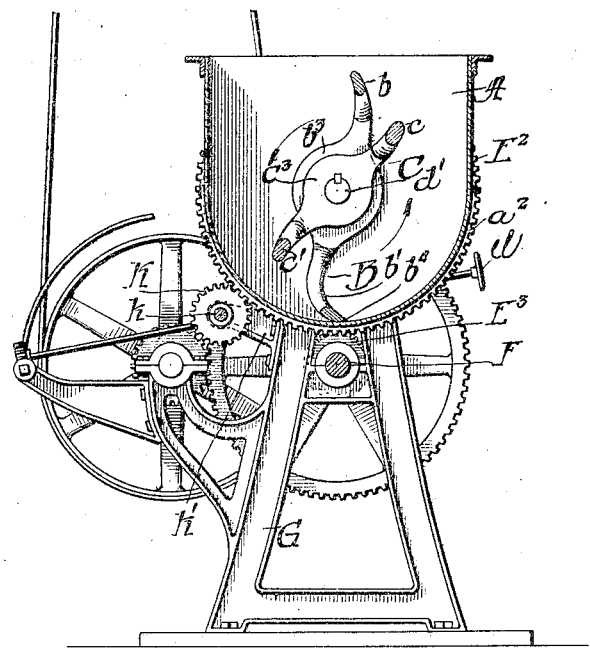
Figure 4:
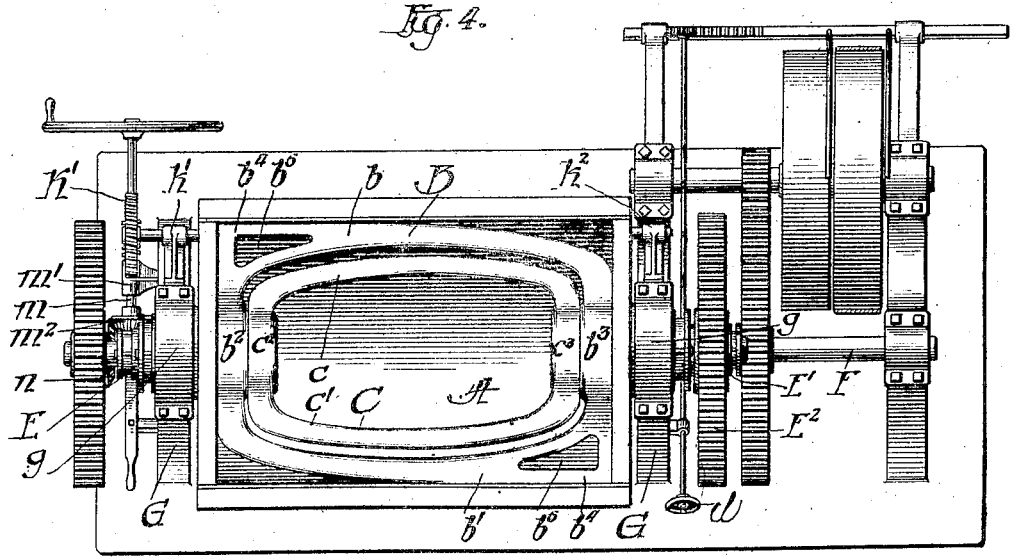

Figure 1 is a view in front elevation of a machine embodying our invention. Fig. 2 is a view in central vertical longitudinal section, parts being shown in elevation. Fig. 3 is a view in vertical cross-section on line 3 3 of Fig. 1. Fig. 4 is a plan view.

A designates the mixing-chamber of our improved machine, this chamber being preferably formed with a curved lower portion and with an open top, as illustrated more particularly in Fig. 3 of the drawings. Within the mixing-chamber A are mounted two mixing-blades B and C, the preferred construction of these blades being that illustrated in the accompanying drawings, although the precise construction and arrangement of the mixing-blades may be varied without departure from the spirit of the invention. Each of the blades B and C extends axially of the mixing-chamber A, the path of revolution of one of the blades C being nearer the axis of the machine than the path of revolution of the blade B. As shown, the blade B comprises the two arms $b$ and $b'$ that are con-
nected at their ends by the hubs $b^2$ and $b^3$, these arms and their connecting-hubs being formed as a single casting. By preference each of the arms $b$ and $b'$ has a portion of its length formed with a part $b^4$, adapted to travel in close proximity to the inner wall of the mixing-chamber A, as shown in Figs. 3 and 4, and each of these arms $b$ and $b'$ is not only curved in radial direction, as indicated in Fig. 3 of the drawings, but is curved also slightly in such manner that the flattened end portion that travels most nearly to the wall of the mixing-chamber shall be slightly in advance of the reduced portions of the blades or arms. The result of this construction is that each of the arms $b$ and $b'$ of the blade B serves to move the batch of dough toward the center of the mixing-chamber, thus subjecting the batch to a more effective action of the mixing-blades and preventing the banking of the dough at the ends of the mixing-chamber. Preferably that portion of each of the arms $b$ and $b'$ adjacent it flattened part $b^4$ is formed with an open space $b^5$, through which a portion of the dough will pass as the blade B is revolved.

The mixing-blade C preferably comprises the arms $c$ and $c'$, that are arranged axially of the plane of revolution of the blade C and are connected to hubs $c^2$ and $c^3$, that are formed in piece with the arms $c$ and $c'$. The hubs $c^2$ and $c^3$ are keyed to the sections $d$ and $d'$ of the axle whereby the blades B and C are driven. The sections $d$ and $d'$ of the axle pass through bearing-sleeves E and E', to which are keyed the hubs $b^2$ and $b^3$ of the blade B. To the outer end of the sleeve E is keyed a gear-wheel $E^2$, by which revolution will be imparted to the blade B from a pinion $E^3$, that is mounted upon the main drive-shaft F. The bearing-sleeves E and E' pass through hubs $a$, that are formed at the ends of the mixing-chamber A, these hubs $a$ being revolubly mounted in suitable bearings $g$, formed at the upper ends of the standards or supports G. The sleeves E and E', and as well also the hubs $a$ at the ends of the mixing-chamber, are provided with stuffing-boxes at their outer ends, as shown. Both the sleeves E and E' and the hubs $a$ serve as bearings. The section $d$ of the shaft that imparts revolution to the blade C has keyed to its outer end a gear-wheel H, that meshes with the pinion H', that is keyed to the end of the drive-shaft F. By reference more particularly to Fig. 2 of the drawings it will be seen that the pinion H' is of somewhat greater diameter than the pinion E³, the result being that a more rapid speed of revolution will be imparted to the revoluble blade C through the medium of the gear-wheel H than is imparted to the mixing-blade B through the medium of the gear-wheel E². The drive-shaft F will be provided with suitable means for imparting revolution thereto, as shown in the drawings, and the machine may be furnished with a belt-shifter W for throwing the machine into and out of operation; but these form no part of the present invention. Preferably the under side of the mixing-chamber A is provided with curved rack-bars a², with which will mesh the pinions K, that are carried upon the shaft k, this shaft being journaled in bearing-brackets k' and k², that project rearwardly from the standards G. This shaft k has keyed to one of its ends a pinion K', that meshes with a worm-gear fixed to one end of a shaft m, that is journaled in a bracket m', the opposite end of this shaft m having keyed thereto a beveled pinion m². The pinion m² is adapted to mesh with either one of two beveled pinions n and n', that are slidably mounted upon the drive-shaft F. The pinions n and n' are furnished with clutch members by which either of them may be caused to engage with a sliding clutch member P, that is mounted upon the shaft F. The position of the clutch member P is controlled by means of a hand-lever R, that is pivoted, as shown, to a bracket r, projecting from one of the standards G of the machine. It will thus be seen that by grasping the hand-lever R the attendant may throw either one of the beveled pinions n or n' into mesh with the beveled gear-wheel m². In this way a slow rotary movement will be communicated through the worm-gear to the shaft k and from the shaft k and the pinions K' thereon to the rack-bars a², thus causing the receptacle A to be turned either downward to discharge its contents or upward to receive a new batch.

From the foregoing description it will be seen that when revolution is imparted to the drive-shaft F movement will be transmitted therefrom through the pinion E³, the gear-wheel E², and the sleeve E to the revoluble blade B, and at the same time revolution will be imparted to the revoluble blade C through the medium of section d of its shaft, the gear-wheel H, the pinion H', and the drive-shaft F. Inasmuch, however, as the pinion H' is of somewhat greater diameter than the pinion E³ it follows that the blade C will be driven at a faster rate of speed than the blade B. The result of this will be to cause the blade C to draw or pull the dough away from the arms b and b' of the blade B, while this latter blade is revolving at a slower speed than the blade C. In practice it is found that by thus imparting differential speeds of revolution to the blades B and C not only is a most thorough mixing of the batch effected, but the pulling of the dough by the blades B and C thus revolving at different speeds and in the same direction most effectively opens up the gluten cells of the flour and imparts a much more desirable fiber to the batch than is possible to be obtained with ordinary mixing-machines.

Having thus described our invention, what we claim as new, and desire to secure by Letters Patent, is—

1. A mixing-machine comprising a mixing-chamber, and a plurality of revoluble mixing-blades arranged within said chamber at different distances from their axis of revolution and means for imparting different speeds of revolution in the same direction to said blades whereby the stirring and pulling of the batch within the chamber is effected.

2. A mixing-machine comprising a mixing-chamber, a plurality of mixing-blades arranged within said chamber, one of said blades having arms extending lengthwise thereof and arranged to travel in close proximity to the wall of the mixing-chamber and another of said blades having arms extending lengthwise thereof and arranged to revolve within the arms of said first-mentioned blade and means for imparting different speeds of revolution in the same direction to said blades.

3. A mixing-machine comprising a mixing-chamber having a curved body, inner and outer concentrically-revoluble mixing-blades arranged within said body, the outer one of said blades having oppositely-disposed and reversely-curved arms extending longitudinally of the mixing-chamber and arranged to travel in proximity to the wall thereof, and the inner of said blades having arms arranged to travel within the path of the outer mixing-blade, and means for imparting different speeds of revolution in the same direction to the said blades.

4. A mixing-machine comprising a mixing-chamber having a curved body, inner and outer concentrically-revoluble mixing-blades arranged within said body, the outer one of said blades having longitudinal arms shaped substantially as shown and adapted to travel in proximity to the wall of the mixing-chamber and the inner of said blades having arms arranged to travel within the path of the outer mixing-blade, tubular sleeves connected to the outer mixing-blade, shaft-sections passing through said tubular sleeves connected to the inner mixing-blade and gearing for imparting different speeds of revolution to said mixing-blades.

5. A mixing-machine comprising a mixing-chamber having tubular bearings at its ends, supports whereon said bearings are revolubly mounted, gear mechanism whereby said mixing-chamber may be turned to discharge its contents, bearing-sleeves extending through the tubular bearings at the ends of said mixing-chamber, a gear-wheel connected to the outer end of one of said bearing-sleeves, a mixing-blade connected to the inner end of said last-mentioned bearing-sleeve, a shaft-section extending through one of said bearing-sleeves, a gear-wheel connected to said shaft section at its outer end, a mixing-blade connected to the inner end of said shaft-section, and a drive-shaft provided with pinions engaging said gearing-wheels.

FELIX NOTZ.
JAMES McBRIAR.

Witnesses to signature of Felix Notz:
GEORGE P. FISHER, Jr.,
KATHARINE GERLACH.

Witnesses to signature of James McBriar:
CARL H. BECKHAM,
RUPERT HOLLAND.